April 18, 1944.  W. A. TRIPP  2,346,799
RESILIENT TIRE
Filed Jan. 7, 1942   2 Sheets-Sheet 2

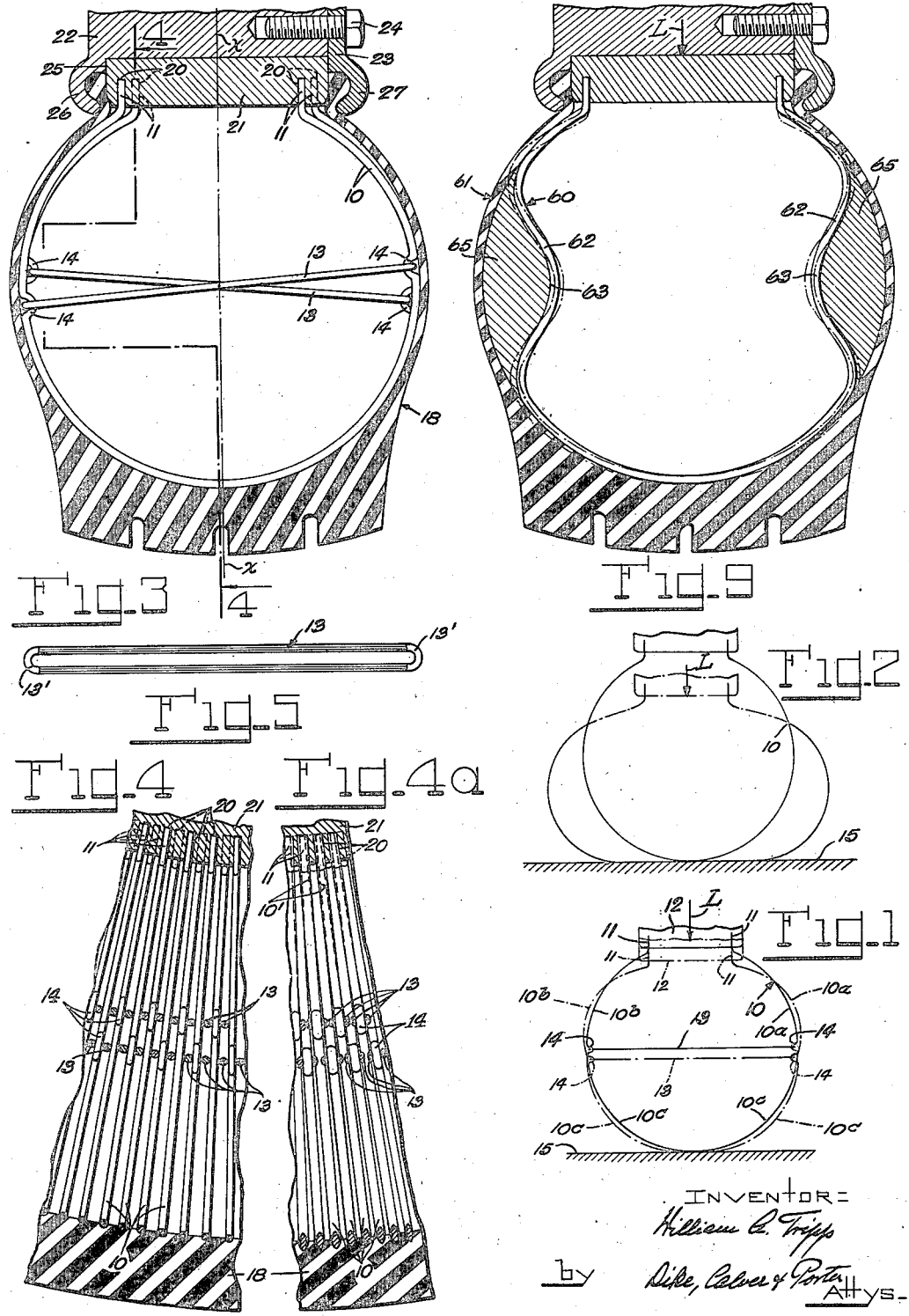

INVENTOR:
William A. Tripp
by Dike, Calver & Porter
Attys

Patented Apr. 18, 1944

2,346,799

UNITED STATES PATENT OFFICE 2,346,799

RESILIENT TIRE

William A. Tripp, Winthrop, Mass.

Application January 7, 1942, Serial No. 425,829

10 Claims. (Cl. 152—276)

This invention relates to tires for vehicle wheels and more particularly to resilient tires which are sustained under load by spring structures therein rather than by air pressure.

A number of spring-sustained rubber tires have been designed in the past, but they are inadequate or entirely unsuitable for modern load and speed requirements. Thus, their spring structures are too resilient to satisfactorily sustain the tires under load unless they are made of unusually strong spring material. Spring structures made of unusually strong spring material are, however, so heavy that they impair safe driving, and particularly steering, at relatively low speeds and prohibit driving at higher speeds altogether. These prior spring structures furthermore permit excessive flexing of the rubber tires under driving conditions so that the latter become excessively hot and, in consequence, deteriorate after a relatively short time.

It is the primary aim and object of the present invention to provide a spring structure for a rubber tire which imparts to the latter a resiliency comparable to that of a pneumatic tire, is made of relatively light spring material and in its aggregate adds comparatively little to the weight of the tire.

It is another object of the present invention to incorporate the spring structure in a tire casing so that the same form a self-contained unit.

It is also among the objects of the present invention to provide, as an alternative to a spring structure which is loose or is incorporated in a tire casing, a flexible liner to which the spring structure is secured and which fits into a tire casing substantially like and inner tube.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings.

Fig. 1 illustrates diagrammatically a novel spring structure embodying the present invention.

Fig. 2 illustrates diagrammatically the performance of a previously known spring lacking the present invention.

Fig. 3 is a cross section through a resilient tire in which the novel spring structure is embodied.

Fig. 4 is a fragmentary section through the tire taken substantially on the line 4—4 of Fig. 3.

Fig. 4a is a section similar to Fig. 4, showing a somewhat different coordination of the parts of the novel spring structure.

Fig. 5 illustrates a detail of the novel spring structure employed in the tire shown in Figs. 3 and 4.

Fig. 9 is a cross-section through a resilient tire embodying a modified spring structure.

Figure 6:
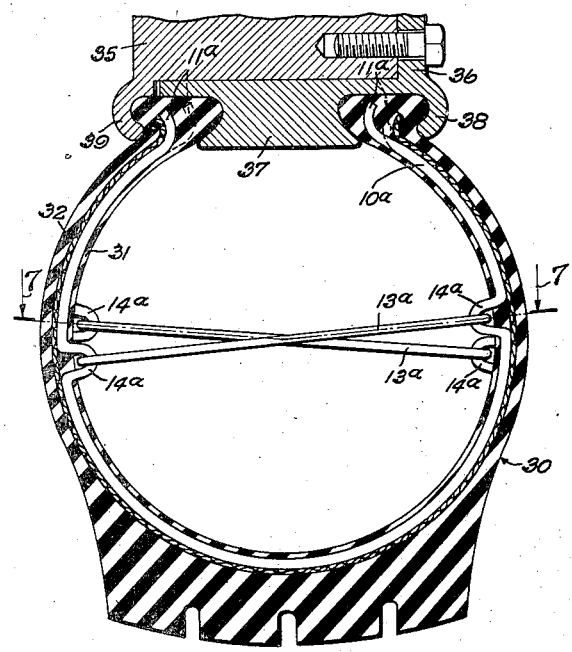
Fig. 6 is a cross-section through a tire in which the novel spring structure is embodied in a modified manner.

Referring to the drawings and particularly to Fig. 1 thereof, there is shown, in a diagrammatic manner, a spring structure in which the principle of the present invention is disclosed. The reference numeral 10 denotes an arcuate member which is made of spring material and secured with its ends 11 in a support 12. Suitably anchored with its opposite ends on substantially diametrically opposite portions of the spring member 10 is a substantially horizontally disposed, inextensible tie or brace 13. In the present instance, the spring member 10 is provided with diametrically opposite kinks or hooks 14 on which the ends of the brace 13 are anchored. When the spring member 10 is not subjected to a load, the same assumes the illustrated full line position. However, when the spring member is under a load L, the same is compressed or bent into the illustrated dot-and-dash line position. If the inextensible brace 13 were not provided, the loaded spring member 10 would spread laterally in the fashion shown diagrammatically in Fig. 2 and sag on the ground 15 to the considerable extent illustrated. The brace 13 (Fig. 1) greatly restricts such sagging of the loaded spring member by preventing any lateral expansion of the latter at the kinks 14 thereof and thereby greatly reinforcing the remaining spring member against such expansion. The braced spring member in Fig. 1 is particularly noteworthy for the slight bending under load of the spring lengths 10a, 10b and 10c into which the spring member is divided by the brace 13. This slight bending of the braced spring member approximates that of an inflated pneumatic tire under load. To obtain approximately the same limited bending of the non-braced spring member (Fig. 2) under the same load, it would have to be made of far stronger, and hence, heavier and less wieldy, spring material than the braced spring member.

Figure 5A:
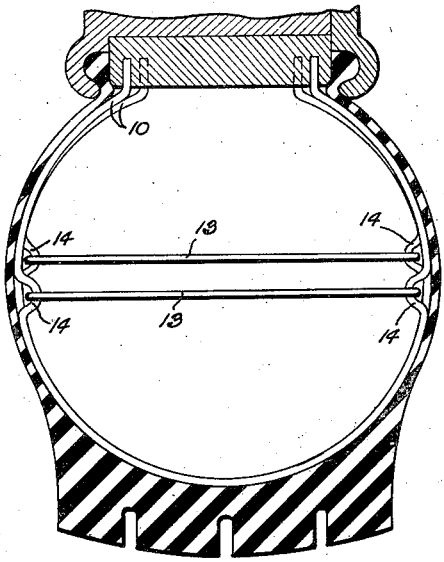
Fig. 5a is a section similar to Fig. 1, showing a modified arrangement of certain elements of the novel spring structure in the tire.
Figure 5B:
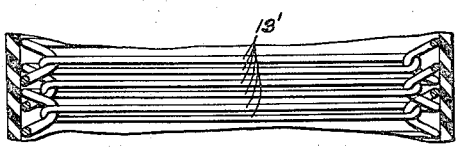
Fig. 5b is a fragmentary tire section showing a modified arrangement of certain elements of the novel spring structure.

Figs 3 and 4 show the novel spring structure embodied in a conventional tire casing 18. To this end, the free ends 11 of a multiplicity of radially disposed spring members 10 are received in sockets 20 which are provided in an annular support 21 that is mounted on the rim 22 of any conventional wheel. The support 21 is held in place on the rim 22 preferably by means of a demountable ring 23 which is secured to said rim by screws 24 and maintains said support in engagement with a shoulder 25 on said rim. The rim 22 and the demountable ring 23 are provided with flanges 26 and 27, respectively, which secure the tire casing 18 in place. In mounting the tire casing on the wheel rim, the flange 27 of the demountable ring 23 draws the inner surface of the casing, which is usually of fabric (not indicated), against the arcuate spring members 10 which thereupon become embedded in said inner tire surface to the extent illustrated in Fig. 4 and are thus held against any lateral shifting relative to each other under all conditions. Since the spring members 10 are fairly narrowly spaced from each other (Fig. 4) for the sake of a fairly uniform spring sustenance of all peripheral portions of the tire casing, and in order to avoid a possible break in the material of the support 21 between consecutive sockets 20, the latter are preferably staggered in the fashion illustrated in Figs. 3 and 4. To this end, all spring members are preferably made identical, particularly as to the spacing of their ends 11 from the plane $x$—$x$ of the tire (Fig. 3), in which case consecutive spring members are merely inverted 180° to each other in order to obtain the referred staggering of their ends. The staggering of the ends 11 of the spring members axially of the tire (Fig. 3) also makes it possible to space said spring members so narrowly that portions thereof near their ends 11 may overlap each other within the casing 18 as indicated at 10' in Fig. 4a without normally contacting each other. The spring members 10 may be of the circular cross-sectional shape shown in Fig. 4 or of any other suitable cross-sectional shape such as the oval shape illustrated in Fig. 4a, for instance. The substantially diametrically opposite kinks 14 of consecutive spring members 10 are also preferably staggered radially of the tire (Fig. 3), so that consecutive braces 13 cross each other substantially in the middle thereof. The braces 13 may be of any suitable construction, and are preferably of the elongated loop shape illustrated in Fig. 5 and wound from inextensible but bendable wire in successive loops with the ends suitably joined to the loops as by copper-brazing, for instance. The opposite ends of the braces 13, which hook over the kinks 14 of the spring members, are preferably reenforced against wear or breakage by copper-brazing the same as at 13' (Fig. 5), but the intervening lengths of the braces are not copper-brazed or stiffened in any other way so as to preserve their ability to give or bend under the impact of the casing 18 when hitting a curb stone or other obstruction from the side. With the bendable, though inextensible, braces 13 crossing each other in the manner shown in Fig. 3, the same will, if ever in contact with each other, either normally or on being bent under the impact of the casing, rub against each other at their crossings with such a negligible force as to have no noticeable wearing effect upon said braces. Instead of having the kinks 14 of consecutive spring members so staggered that consecutive braces 13 cross each other (Fig. 3), the kinks of consecutive spring members may also be so alternately staggered that consecutive braces are spaced radially of the tire in the fashion shown in Fig. 5a. With this latter brace arrangement, consecutive spring members 10 may be very narrowly spaced without affording the braces a rubbing contact between each other under normal conditions. The same may be accomplished with crossing braces by twisting the kinks in the spring members to the extent shown in Fig. 5b so that the braces become similarly twisted and their legs 13' spaced from each other.

The spring members 10, which are in firm engagement with the inner wall of the casing, resiliently sustain the latter cross-sectionally the same as a conventional, air-inflated innertube. The braces 13 across the spring members not only reenforce the latter against bending under load conditions in such a manner that the casing sustained thereby flexes approximately like one sustained by the air pressure in an innertube, but also permit the use of very light spring material for the spring members.

Figure 7:
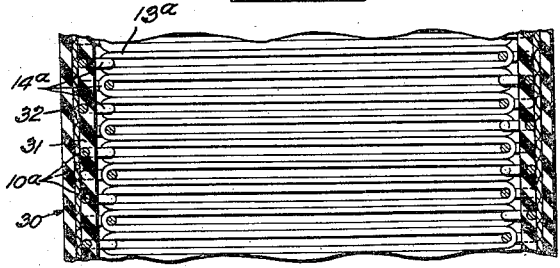
Fig. 7 is a fragmentary section through the tire taken substantially on the line 7—7 of Fig. 6.

Fig. 6 shows a modified embodiment of the novel spring structure in a tire casing. In this case, the spring members 10a, which are disposed relative to each other and staggered at their ends 11a substantially like those in Fig. 3, are molded into the tire casing 30, preferably during the manufacture of the latter. To this end, the spring members 10a are preferably embedded in an inner rubber layer 31 of the casing (see also Fig. 7) and bear against the customary fabric layers 32 of the latter. The kinks 14a of the molded-in spring members 10a preferably extend through the inner rubber layer 31 and into the interior of the casing to permit the mounting of the braces 13a after the molding of the spring members 10a in the casing. The braces 13a are inextensible but bendable, and may be constructed in any suitable manner to facilitate their anchorage on the kinks 14a after the molding of the spring members in the casing. The embedded spring members 10a maintain their relative disposition under all riding conditions, and the casing with the contained spring structure may be readily mounted on the rim 35 of a wheel in the following manner. A demountable ring 36 on the wheel rim 35 is provided with a swallow-tail piece 37 which projects between the open ends of the casing to prevent inward collapse of the same. A flange 38 on the ring 36 not only holds the adjacent open end of the casing in place, but also forces the other open end thereof into firm engagement with a flange 39 on the wheel rim.

Figure 8:
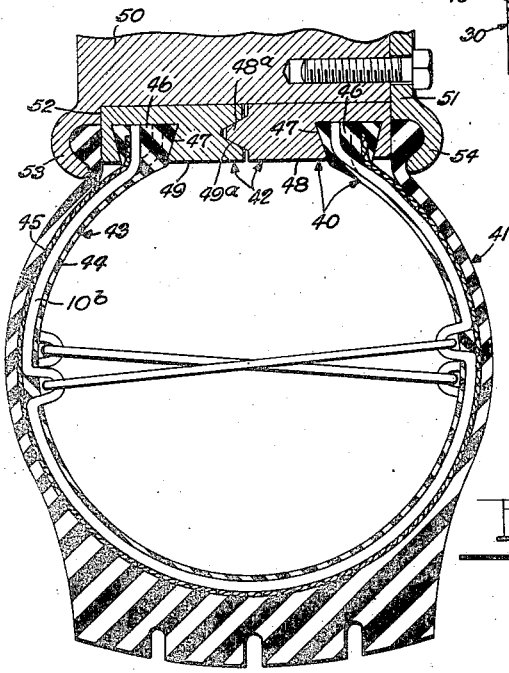
Fig. 8 is a cross-section through a tire in which the novel spring structure is embodied in another modified manner.

As an alternative to the constructions shown in Figs. 3 and 6, there is shown in Fig. 8 a spring-sustained tire in which the novel spring structure is embodied in a liner 40 which fits into a conventional tire casing 41 in the manner of an inner tube. The liner 40 comprises a rigid, annular ring structure 42 and an annular, flexible bag 43 which carries the novel spring structure. The spring members 10b are preferably molded in the bag 43 which is part-tubular in cross-section and preferably consists of an inner rubber layer 44 and an outer fabric layer 45 of any suitable number of plies. The ends 46 of the flexible bag 43 are anchored in the ring structure 42 by being molded into wedge-shaped annular grooves 47 thereof. For molding purposes, the ring structure 42 consists of partible rings 48 and 49 which have preferably an interfitting tongue and groove 48a, 49a. The liner 40 is held with its ring structure 42 in place on the rim 50 of a wheel by means of a demountable ring 51 which holds the parted rings 48, 49 in engagement with each other and with an annular shoulder 52 on the wheel rim 50. The wheel rim 50 as well as the demountable ring 51 have annular flanges 53 and 54, respectively, which hold the tire casing 41 in place. The liner construction 40 has the advantage that it permits the use of a conventional tire casing. In mounting a new casing on the wheel, it is preferable to first remove the liner from the wheel and inserting it properly into the casing. The natural flexibility of the casing, as well as the resiliency of the liner with the exception of the rigid, though partible, ring structure 42, permit the insertion of the liner into the casing. The ring structure 42 may also be parted in any other suitable manner to facilitate the insertion of the liner into the casing. Thus, the ring structure 42 may not be parted in the manner illustrated in Fig. 8, but consist of a single ring which is split somewhere along its periphery. After the insertion of the liner into the casing, they are mounted on the wheel rim 50 and secured in place thereon by the ring 51.

Fig. 9 discloses a tire-sustaining spring structure which, though performing substantially like the described spring structure of Fig. 3, eliminates the brace across each spring member. To this end, spring members 60, of which there is only one shown in Fig. 9 and which may be as closely, or even more closely, spaced from each other in the casing 61 than the spring members in Fig. 4, are substantially of the cross-sectional shape of the inner casing wall, except intermediate lengths 62 of said spring members which are adjacent the sidewalls, respectively, of the casing. The intermediate length 62 of each spring member 60 are inwardly looped in a fashion like, or similar to, that shown in Fig. 9 to reenforce the spring member against outward expansion under load. The loops of the spring lengths 62 are such that their apexes 63 tend to bend inwardly when subjected to a load L, the more so the greater the load. On the other hand, the spring lengths which engage the inner casing wall and continue to the apexes 63 tend to bend outwardly under the load L. Consequently, the oppositely directed bending tendencies of the apexes 63 and the remaining lengths, respectively, of each spring member counteract each other such that the total bending of the entire spring length under the load L is of the limited extent indicated by the deviation of the spring member from the unloaded position shown in full lines in Fig. 9 to the loaded position shown in dot-and-dash lines in said figure. Thus, with fillers 65 of rubber or any other suitable non-metallic material between the sidewalls of the casing and the looped portions 62 of the spring members 60 therein, the casing 61 is flexed substantially the same as a conventional pneumatic tire when subjected to the same load and road conditions. That the spring structure of Fig. 9 may also be advantageously molded into the casing or into a separate liner is apparent.

I claim:

1. A tire comprising a flexible casing, arcuate springs disposed in said casing transversely thereof for sustaining the latter cross-sectionally, and means positively preventing outward yielding under any tire load of the springs at the opposite portions thereof where maximum outward yielding would otherwise occur.

2. A tire comprising a flexible casing, arcuate springs disposed in said casing for sustaining the same, and an inextensible brace across those opposite portions of each spring where maximum outward yielding under load would otherwise occur.

3. A tire comprising a hollow flexible casing open at the rim portion thereof, a ring member projecting into said open rim portion, arcuate springs mounted with their ends in said ring member and disposed inside said casing in planes, respectively, which radiate from the tire axis and extend substantially parallel thereto for sustaining the casing, and an inextensible brace across each spring passing substantially through the center thereof and extending substantially parallel to the tire axis.

4. A tire comprising a moulded, hollow flexible casing, arcuate springs moulded in said casing and disposed in planes, respectively, which radiate from the tire axis and extend substantially parallel thereto for sustaining the casing, and an inextensible brace across each spring passing substantially through the center thereof and extending substantially parallel to the tire axis.

5. In combination with a hollow flexible casing, a liner for sustaining said casing comprising a moulded tubular member fitting into said casing and being flexible at least where engaging the tread portion and side walls of the latter, arcuate springs moulded in said member and disposed in planes, respectively, which radiate from the tire axis and extend substantially parallel thereto for sustaining said member, and an inextensible brace across each spring passing substantially through the center thereof and extending substantially parallel to the tire axis.

6. In combination with a hollow flexible casing open at the rim portion thereof, a liner for sustaining said casing comprising a rigid ring projecting into said open rim portion, a moulded annular flexible bag fitting into said casing and having its ends mounted in said ring, arcuate springs moulded in said bag and disposed in planes, respectively, which radiate from the tire axis and extend substantially parallel thereto for sustaining said bag, and an inextensible brace across each spring passing substantially through the center thereof and extending substantially parallel to the tire axis.

7. A tire comprising a flexible casing with an inner rim portion, arcuate springs disposed in said casing in planes, respectively, which radiate from the tire axis and extend substantially parallel thereto for sustaining the casing and having their ends adjacent said rim portion, said springs being so narrowly spaced that adjacent end portions of consecutive springs overlap each other and said overlapping end portions being so staggered axially of the tire that they remain out of contact with each other, means for anchoring the ends of said springs relative to said rim portion, and an inextensible brace across each spring passing substantially through the center thereof and extending substantially parallel to the tire axis.

8. A tire comprising a flexible casing with an inner rim portion, arcuate springs disposed in said casing in narrowly spaced planes, respectively, which radiate from the tire axis and extend substantially parallel thereto for sustaining the casing and having their ends adjacent said rim portion, the adjacent ends of consecutive springs being staggered axially of the tire for substantially separating them, means for anchoring the ends of said springs relative to said rim portion, and an inextensible brace across each spring passing substantially through the center thereof and extending substantially parallel to the tire axis.

9. A tire comprising a flexible casing, arcuate springs disposed in said casing in planes, respectively, which radiate from the tire axis and extend substantially parallel thereto for sustaining the casing, each spring having two opposite, inwardly projecting hooks adjacent the side walls, respectively, of the casing, and a brace across each spring having its ends received by the hooks of the latter, said brace being of inextensible but bendable wire wound in successive loops and having its ends secured to the latter.

10. A tire comprising a hollow flexible casing, arcuate springs disposed in said casing in planes, respectively, which radiate from the tire axis and extend substantially parallel thereto for sustaining the casing, and inextensible but bendable braces across said springs, respectively, consecutive braces being slightly oppositely inclined to the tire axis so that they cross each other and any contact between them is restricted substantially to their crossings.

WILLIAM A. TRIPP.